No. 835,967. PATENTED NOV. 13, 1906.
E. L. MARTIN.
MOLDING MACHINE.
APPLICATION FILED NOV. 10, 1905.
2 SHEETS—SHEET 2.
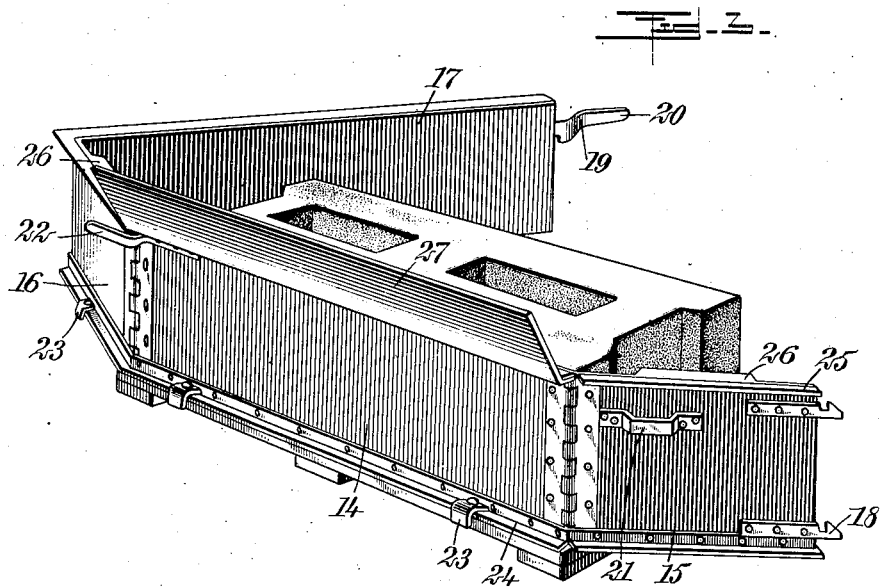
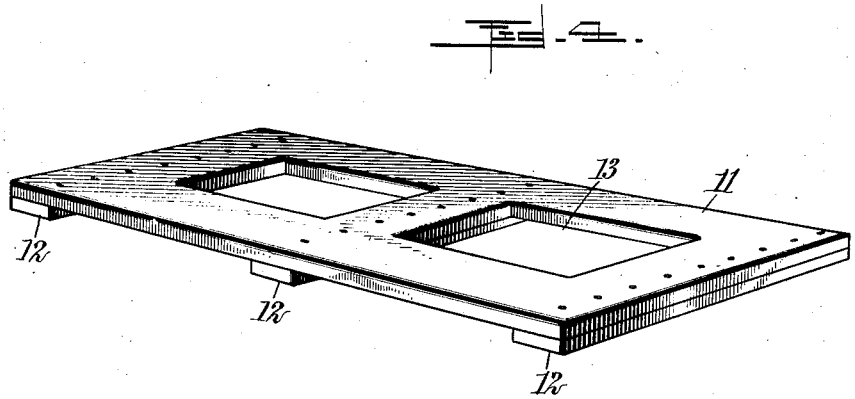
WITNESSES:
INVENTOR
Earl L. Martin
BY
ATTORNEYS

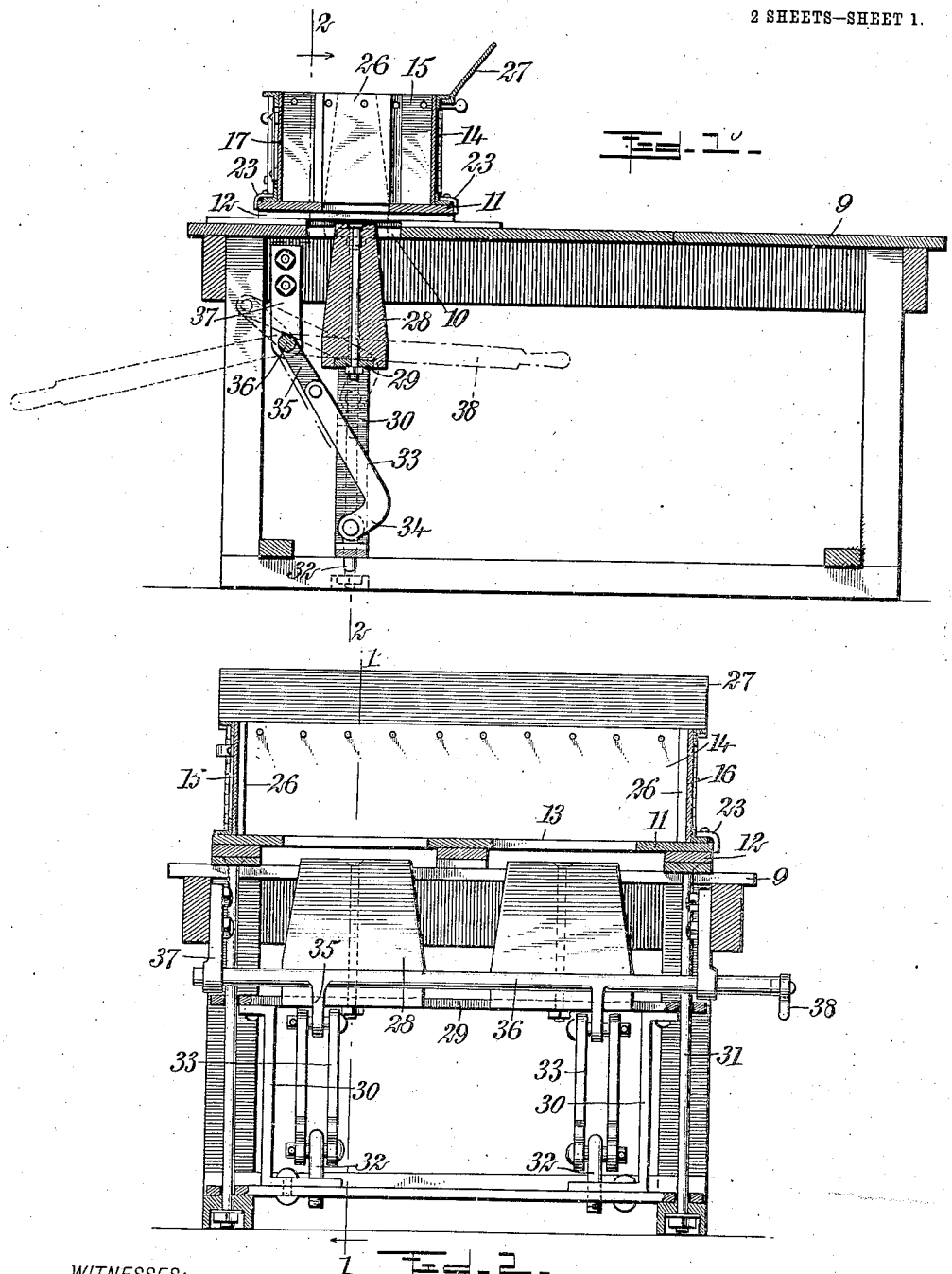

UNITED STATES PATENT OFFICE.

EARL L. MARTIN, OF WOODBURN, IOWA.

MOLDING-MACHINE.

No. 835,967.  Specification of Letters Patent.  Patented Nov. 13, 1906.

Application filed November 10, 1905. Serial No. 286,680.

*To all whom it may concern:*

Be it known that I, EARL L. MARTIN, a citizen of the United States, and a resident of Woodburn, in the county of Clarke and State of Iowa, have invented a new and Improved Molding-Machine, of which the following is a full, clear, and exact description.

My invention relates to a molding-machine capable of general use for the formation of various kinds of articles from plastic materials, but is more especially designed for molding hollow building-blocks.

The principal objects of the invention are to so construct a machine of this character, including the mold, as to permit the production of blocks at exceedingly low labor cost and at the same time to make a block that will mature in a shorter time than with ordinary machines on account of permitting the use of a wetter mixture than is ordinarily employed. Further objects of the invention will appear below.

Reference is to be had to the accompanying drawings, forming a part of this specification, in which similar characters of reference indicate corresponding parts in all the views.

Figure 1 is a longitudinal sectional view on the line 1 1 of Fig. 2, showing a machine constructed in accordance with my invention. Fig. 2 is a sectional view of the same on the line 2 2 of Fig. 1. Fig. 3 is a perspective view of the mold partially opened and showing the building-block therein, and Fig. 4 is a perspective view of the pallet.

I prefer to use a support 9, preferably in the form of a bench or table of just sufficient height to permit the necessary operations. This table has a perforation 10, and on this table I place a pallet 11. This pallet, as shown in Fig. 4, is preferably provided with cleats 12 on the bottom to hold it above the table, and with perforations 13 registering with the perforation 10 for the passage of any cores that may be used in the construction of the article to be molded. The pallet is intended to constitute the bottom of the mold. The mold is so constructed as to form an article of the desired shape. In the present instance I have illustrated this part of the invention as comprising four walls, a side wall 14, to which are pivotally connected two end walls 15 and 16, and on one of these end walls is rigidly mounted a second side wall 17. From an inspection of Fig. 3 the way in which the mold opens will be obvious. The end walls being swung outwardly upon their pivots, it will be seen that the surfaces thereof, as well as the molding-surface of the side wall 17, will be gradually and progressively separated from the surfaces of the molded article from one end to the other. This does away with the sudden separation of all parts of any one of the molding-surfaces from the molded article at the same time, which is a feature of many forms of molds and molding-machines. The separation of the mold parts in this sudden manner is liable to injure the molded article unless it is in a perfectly hard state on account of the formation of inclosed spaces producing a certain degree of vacuum when the walls are removed. This disadvantage is entirely overcome by the principle involved in the mold illustrated.

For the purpose of holding the mold parts together one of the ends is provided with hooks 18 and the movable side with latches 19 for engaging them. While a plurality of latches are employed, they are preferably connected together, and one of them is provided with a handle 20, so that they can be operated simultaneously by lifting the handle. I have also shown one end provided with a handle 21 and the stationary side with a handle 22 for use in lifting and otherwise handling the mold.

In order to accurately center the mold upon the pallet, certain of the sides and ends are provided with clips 23, which extend downwardly from their lower edges. These clips are spaced sufficiently from the sides of the mold-walls to engage the edges of the pallet, which is preferably somewhat larger than the outside of the mold, and consequently when the mold is closed the walls thereof are always in the same position with respect to the pallet. I have shown these clips as being mounted upon angle-irons 24, which form the lower edges of the several walls of the mold. Similar irons 25 are located at the tops of the walls.

In case the article to be molded is to be undercut at the ends, I provide each of the ends with a projection or core 26.

Another important feature of the invention is a shield 27, which is located upon one of the side walls, preferably the rear one, or the one toward which the operator throws the molding material in filling the mold. This shield is slanted outwardly and upwardly from the wall upon which it is located, so that when molding material is thrown in it will prevent any from passing over the rear wall of the mold and being lost or occupying a position in which it will be in the way. The molding material striking this shield slides down the inclined surface thereof into the mold, and consequently all the material which is thrown upon the upper surface of the mold finds its way within the latter.

I have mentioned the fact that the pallet is perforated to allow the passage of cores. For the purpose of molding hollow building-blocks I employ vertically-movable cores 28. These are tapered or given the proper amount of draft to permit their ready withdrawal from the mold and are mounted upon a core-plate 29, which is connected with and mounted upon a frame 30. This frame is provided with vertical guides 31 and with studs 32. With these studs are pivotally connected links 33, having bent lower ends 34 to permit the operation to be described. These links are pivotally connected with arms 35 on an oscillatable shaft 36, which is mounted in bearings 37 upon the frame of the machine. This shaft is provided with an operating-lever 38. It will be observed that the lever 38 is located at an acute angle with respect to the arm 35 and that the bearings 37, and consequently the shaft 36, are located out of the line of movement of the frame and core-plate 29. By constructing the parts in this manner and bending the link 33 as shown in Fig. 1 it is possible to secure a very quick motion of the core-plate and to locate the lever 38 in a convenient position for manipulation by the operator.

The operation of the machine will be readily understood. The lever 38 being operated in such a manner as to bring the core into the position shown in dotted lines in Fig. 1 and the mold-box being closed on the pallet, which can be done by simply bringing the parts together without devoting any attention to the centering thereof, the molding material is introduced, struck off, and tamped in the usual manner.

On account of the construction of the mold material can be introduced in a comparatively wet state, and consequently matures more rapidly than is usually the case with mixtures used for this purpose. When it is sufficiently set to permit the removal of the mold, the handle 20 is lifted and the three movable walls simultaneously withdrawn in the progressive manner mentioned above. The wall 14 can then be drawn back in any desired manner, the clips 23 preventing it from moving inwardly. If desired, a face-piece having any required configuration can be used in this mold; but as this is a common feature in molds of this character I have not illustrated it. Either after or before the mold-walls are removed the lever 38 is turned from the position shown at the left in Fig. 1 to that shown at the right, and that motion rapidly withdraws the cores by allowing the frame 30 to descend by gravity. This motion is accurately guided by the rods 31, and it will be seen that all the parts which it is necessary for the operator to handle are located at a convenient place, so that the entire operation of removing the mold parts from the molded article is accomplished with minimum labor and with great rapidity. These acts having been accomplished, the pallet, with the molded article thereon, can be moved back on the table and a fresh pallet substituted, so that the molding operation can be repeated while the article just produced is being removed to a proper place to dry.

It is believed that the many advantages of this machine will be readily apparent and that they need not be further referred to except to say in a general way that by actual use it has been demonstrated that the rapidity of operation is such as to permit the production of blocks at the rate of one cent each for labor, and, furthermore, it is desired to call attention to the absence of gears and cogs, which are a feature of many kinds of molding-machines and which in use frequently become clogged with molding material and require cleaning.

Having thus described my invention, I claim as new and desire to secure by Letters Patent—

1. A molding-machine comprising a support, a core-plate mounted below it, a guide for said plate, and means for reciprocating the plate toward and from the support, comprising an L-shaped link pivotally connected with the plate, an oscillating shaft, an arm on the shaft pivotally connected with the link, and a lever on the shaft, said lever making an acute angle with the arms, said shaft being mounted out of the line of motion of the core-plate, whereby the core-plate can be rapidly dropped from the support.

2. The combination of a pallet and a mold, the pallet being of larger dimensions than the mold, and clips on the mold for engaging the edges of the pallet for centering the mold thereon, the mold being composed of a series of side and end walls, the end walls being pivoted to one side wall and the other side wall being rigidly mounted on one end wall.

3. A mold comprising side and end walls, the end walls being pivoted to one of the side walls, and the opposite side wall being rigidly mounted on one end wall, whereby all parts of the molding-surface can be progressively removed from the product from one end to the other.

4. A mold comprising side and end walls, the end walls being pivoted to one of the side walls, and the opposite wall being rigidly mounted on one end wall, the first-named side wall having a handle projecting beyond one of the end walls and the rigidly-mounted side wall having a latch on its opposite end projecting beyond the other end wall, the last-named end wall having a hook for receiving said latch and a handle.

In testimony whereof I have signed my name to this specification in the presence of two subscribing witnesses.

EARL L. MARTIN.

Witnesses:
 W. W. SWISHER,
 W. L. GORSIS.